United States Patent [19]
von Feilitzen

[11] Patent Number: 5,186,503
[45] Date of Patent: Feb. 16, 1993

[54] DEVICE FOR CONNECTING A THIN-WALLED HOSE WITH A TUBULAR ELEMENT

[75] Inventor: Johan von Feilitzen, Bor, Sweden
[73] Assignee: Forsheda AB, Forsheda, Sweden
[21] Appl. No.: 684,644
[22] Filed: Apr. 12, 1991
[30] Foreign Application Priority Data
  May 31, 1990 [SE] Sweden .................................. 9001981
[51] Int. Cl.[5] ............................................. F16L 33/22
[52] U.S. Cl. ...................................... 285/174; 285/341; 285/255; 285/249
[58] Field of Search ............... 285/174, 341, 255, 249, 285/382.7

[56] References Cited

U.S. PATENT DOCUMENTS

| | | | |
|---|---|---|---|
| 132,589 | 10/1872 | Libby et al. | 285/249 |
| 418,225 | 12/1889 | Rice | 285/249 |
| 2,167,258 | 7/1939 | Wilson | 285/341 |
| 2,300,464 | 11/1942 | Parker | 285/341 |
| 2,338,686 | 1/1944 | Gredell | 285/341 |
| 3,215,457 | 11/1965 | Teeters | 285/382.7 |
| 3,250,550 | 5/1966 | Lyon | 285/382.7 |
| 3,258,279 | 6/1966 | Johnsen | 285/341 |
| 3,278,206 | 10/1966 | Woodling | 285/382.7 |
| 3,679,239 | 7/1972 | Schmitt | 285/341 |
| 3,814,466 | 6/1974 | Leopold, Jr. | 285/341 |
| 3,923,323 | 12/1975 | Brogan | 285/341 |
| 4,136,897 | 1/1979 | Haluch | 285/382.7 |
| 4,705,304 | 11/1987 | Matsuda et al. | 285/255 |
| 4,775,171 | 10/1988 | Marshall | 285/255 |

FOREIGN PATENT DOCUMENTS

| | | | |
|---|---|---|---|
| 2340717 | 2/1974 | Fed. Rep. of Germany | 285/249 |
| 981569 | 5/1951 | France | 285/341 |
| 564220 | 6/1957 | Italy | 285/341 |
| 524816 | 11/1957 | Italy | 285/255 |
| 718829 | 11/1954 | United Kingdom | 285/341 |
| 647999 | 12/1990 | United Kingdom | 285/341 |

Primary Examiner—Eric K. Nicholson
Attorney, Agent, or Firm—Baker & Daniels

[57] ABSTRACT

A device for connecting a thin-walled hose (4) pulled into a pipe (2) with a tubular element (6) comprises a sleeve-shaped connector element (8). At one end portion the sleeve-shaped connector element (8) is connectable with the tubular element (6) while the other end portion of the connector element is sealingly connected with the thin-walled hose (4). The sleeve-shaped connector element (8) is connected with the thin-walled hose (4) by means of two annular, concentric sealing elements (14; 16) consisting of highly elastic material between which the wall of the thin-walled hose (4) is positioned.

12 Claims, 2 Drawing Sheets

DEVICE FOR CONNECTING A THIN-WALLED HOSE WITH A TUBULAR ELEMENT

The present invention relates to a device for connecting a thin-walled hose pulled into a pipe with a tubular element.

Buried pipes consisting of metal, plastic, concrete or the like which have been subjected to damages can be restored to working order by pulling a liner provided by a relatively thin-walled hose into the pipes. Outside the damaged pipe which has been restored by means of the hose the hose has to be sealingly connected with tubular elements. The tubular elements can be constituted by pipe couplings adapted to be connected with undamaged portions of the pipe or can be constituted by end portions of undamaged sections of the pipe. According to a previously used technique the thin-walled hose has been constituted by a rubber hose. Thereby, the elasticity of the rubber material has made it relatively simple to provide the necessary, sealed connection of the hose with the tubular elements. Recently it has become common practice to manufacture the thin-walled hose from plastic material, the smaller elasticity of the hose material making it impossible to provide the necessary tightness by means of previously known connector devices.

The object of the invention is to provide a device for connecting a thin-walled hose pulled into a pipe with a tubular element, the function of the device being independent of the material of the hose so that a satisfactory function can be obtained also in the case of a hose material having a low elasticity, for example a plastic material.

In order to comply with this object there is provided a device of the kind in question which according to the invention is characterized by the fact that it comprises a sleeve-shaped coupling element which at one end portion is sealingly connectable with the tubular element and at its other end portion is sealingly connected with the thin-walled hose by means of two annular, concentric sealing elements of a high elastic material between which the wall of the thin-walled hose is positioned and which are sealingly pressed towards the sleeve-shaped coupling element and towards the intermediate wall of the thin-walled hose.

In a preferred embodiment of the invention one of the annular sealing elements is positioned in a groove in the sleeve-shaped coupling element, said annular sealing element being formed as a strip having a section which in the compressed state of the sealing element has a thickness in substantial correspondence with the depth of the groove.

In a likewise preferred embodiment of the invention the coupling element comprises a protective pipe surrounding the thin-walled hose between the end portion of the pipe into which the thin-walled hose has been pulled and the sleeve-shaped coupling element. Thereby the thin-walled hose is protected against outside damages at the otherwise exposed portion between the pipe and the coupling element.

The invention is described in the following with reference to the accompanying drawings.

Figure 1:
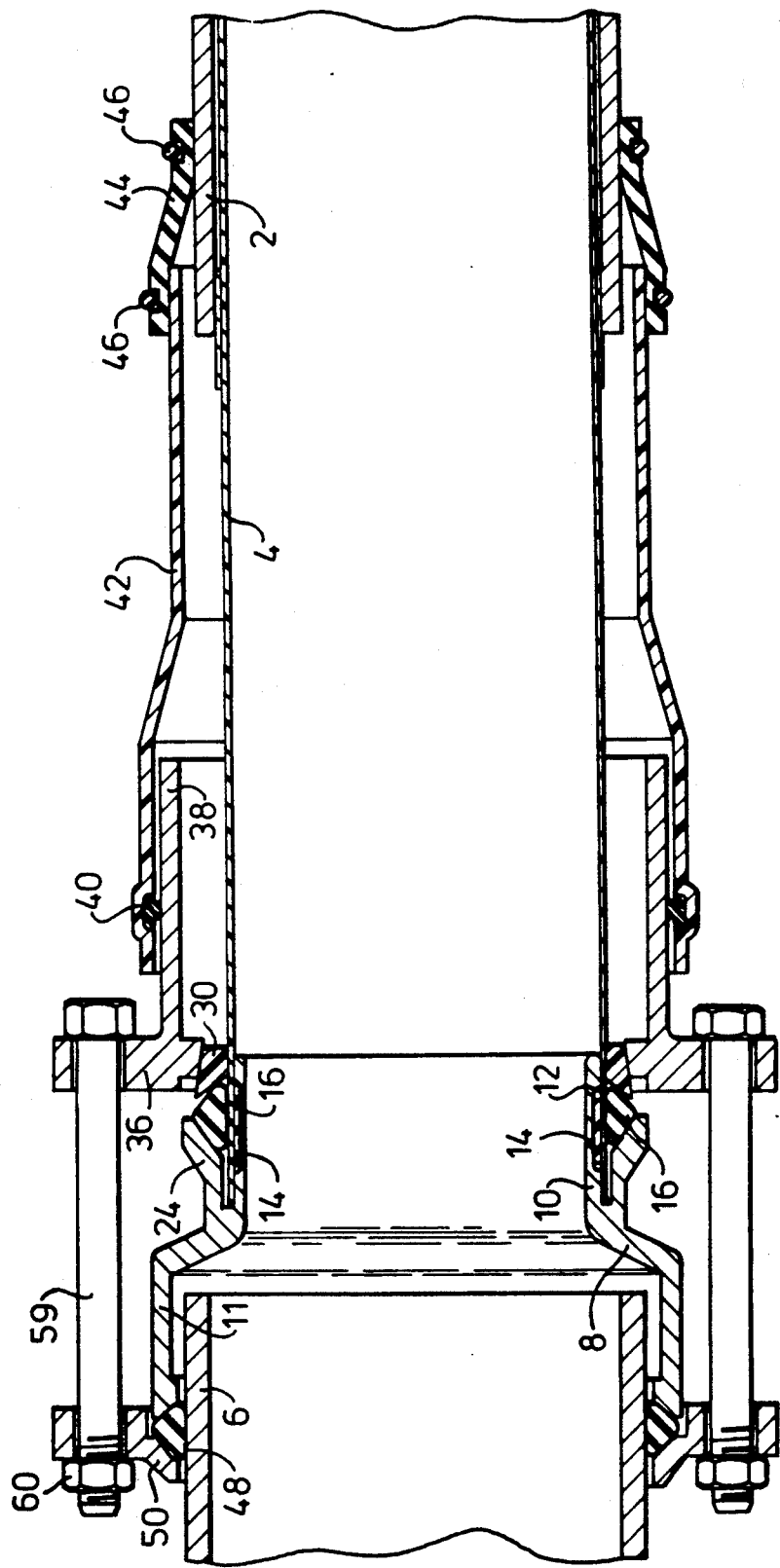
FIG. 1 is an axial section of a connector device according to the invention.
Figure 2:
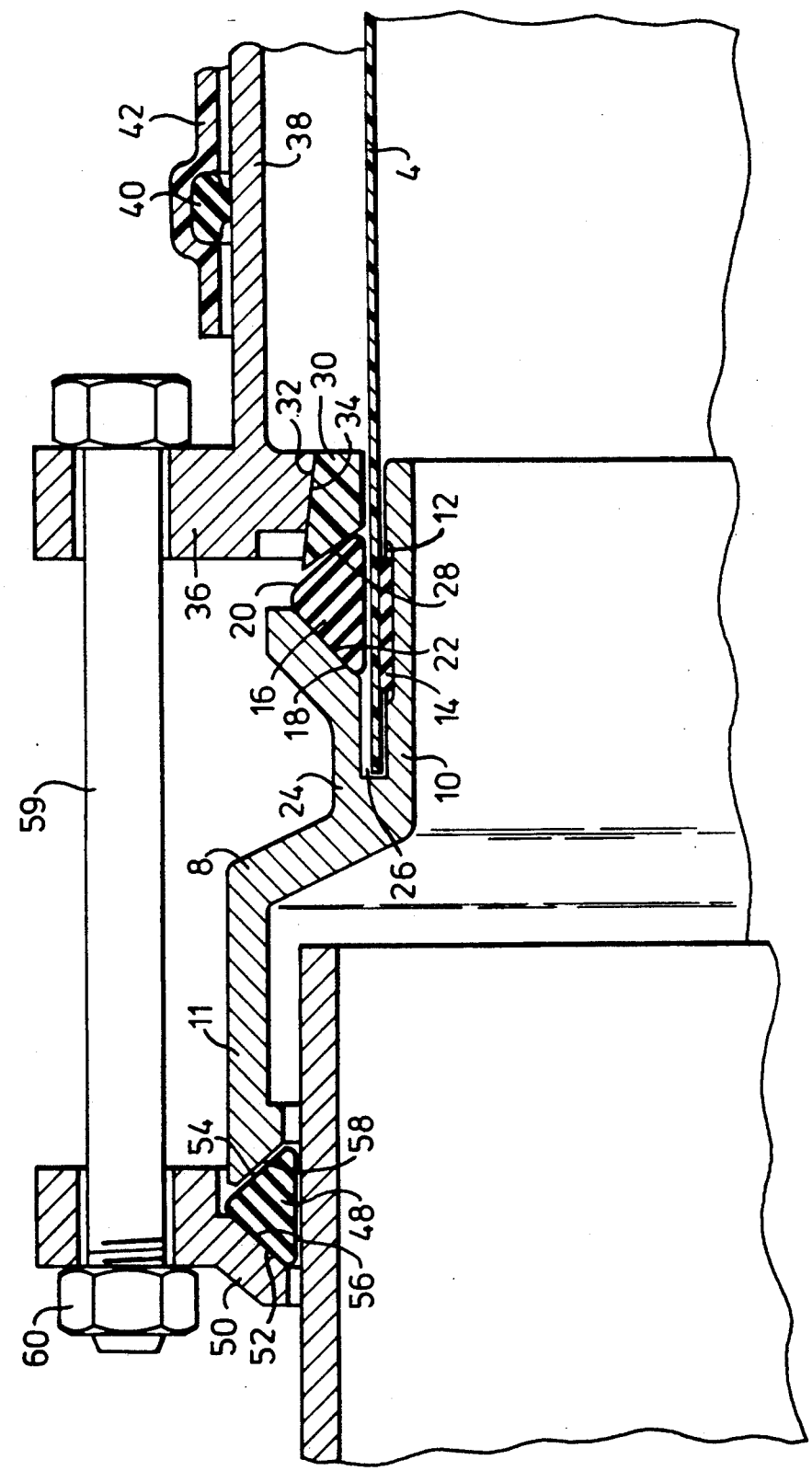
FIG. 2 is a detail of FIG. 1 on an enlarged scale.

The device shown in FIG. 1 is intended for providing a tight connection between a thin-walled hose 4 pulled into a pipe 2 and a tubular element 6. The thin-walled hose 4 forms a lining in the pipe 2 having the object of restoring the pipe 2 which is presumed to be damaged to working order. The tubular element 2 can be constituted by a pipe coupling adapted to be connected with an undamaged section of the pipe to which the thin-walled pipe 4 pulled into the damaged pipe 2 has to be sealingly connected so as to restore the pipe as a whole to a tight condition. It is also possible to let the tubular element 6 constitute the end portion of the undamaged section of the pipe.

The thin-walled hose consists of a relatively non-elastic plastic material for which reason the connector device according to the invention must have the capacity of providing a tight connection of a thin-walled hose with a tubular element without depending on the fact that the hose consists of a special material such as a highly elastic material. The connector device according to the invention comprises a sleeve-shaped connector element 8 having a portion 10 of a small diameter and a portion 11 of a greater diameter. The sleeve-shaped connector element 8 has at its portion 10 a shallow, outer groove 12 in which an annular strip-shaped sealing element 14 of a highly elastic material, preferably rubber, is positioned. The end portion of the thin-walled hose 4 extends around the portion 10 of the sleeve-shaped connector element 8 and engages the sealing element 14 at its inner surface. Radially outside the wall of the thin-walled hose 4 and substantially concentric with the sealing element 14 there is provided a further, annular sealing element 16 of a highly elastic material, preferably rubber. Thus, an annular portion of the wall of the thin-walled hose 4 will be positioned between the sealing elements 14 and 16.

The sealing element 16 is of substantially triangular cross-sectional shape and thereby forms two outer conical surface portions 18 and 20. The conical surface portion 18 engages a conical surface 22 of an outer flange portion 24 of a portion 10 of the sleeve-shaped connector element 8. The flange portion 24 extends a distance over the outer surface of the end portion of the thin-walled hose 4 and forms together with the inwardly positioned portion of the sleeve-shaped connector element a slot 26 in which the extreme end portion of the thin-walled hose 4 is received. The conical surface portion 20 of the sealing element 16 engages a conical surface 28 of a locking ring 30 consisting of a plastic material. The locking ring 30 has an outer conical surface 32 engaged by a conical surface 34 of a clamping ring 36.

The clamping ring 36 comprises a pipe socket 38 axially projecting in a direction away from the sleeve-shaped connector element 8. A protector pipe 42 consisting of a plastic material, for example polyvinyle chloride, is connected with the outer surface of the pipe socket 38 by means of a sealing ring 40. The end of the protector pipe 42 opposite from the pipe socket 38 is sealingly connected with the pipe 2 by means of a socket 44 consisting of rubber and being forced against the outer surface of the protector pipe 42 and the pipe 2 by means of hose clamps 46.

The protector pipe 42 protects the thin-walled hose 4 at the exposed portion of the hose extending between the pipe 2 and the sleeve-shaped connector element 8 against rock, sand and other foreign materials.

The sleeve-shaped connector element 8 is sealingly connected with the tubular element 6 by means of a sealing ring 48 having a triangular cross-section and consisting of elastic material and a clamping ring 50. The sealing ring 48 forms outer conical surfaces 52 and 54 engaging an inner conical surface 56 of the clamping ring 50 and an inner conical end surface 58 on the portion 11 of the sleeve-shaped connector element 8.

The clamping rings 36 and 50 are connected with each other by means of a number of tensioning bolts, for example six bolts. When tensioning the bolts 59 by means of the nuts 60 thereof the clamping rings 36 and 50 are axially displaced towards each other, the conical surfaces 34 and 56 of the clamping rings 36 and 50 providing by their engagement with the locking ring 30 and the sealing ring 48 an axial as well as a radial compression of the locking ring 30 and the sealing ring 48, respectively. The axial displacement of the locking ring 30 provides for an engagement of the locking ring 30 with the sealing element 16 through the conical surface 28 in turn providing an axial compression of the sealing element 16 as well as a radial compression by the engagement with the conical surfaces. Thus, the sealing element 16 is pressed against the outer surface of the thin-walled hose 4 which in turn is pressed against the sealing element 14. This provides for a tight connection of the thin-walled hose 4 with the sleeve-shaped connector element 8 in spite of the fact that the thin-walled hose consists of a relatively non-yielding plastic material.

The radial compression of the locking ring 30 provides that the locking ring forces the wall of the thin-walled hose 4 against an opposite surface of the portion 10 of the sleeve-shaped connector element 8 in turn providing for an axial locking of the thin-walled hose 4 in relation to the sleeve-shaped connector element 8. This action can be strengthened by providing a surface of the locking ring 30 engaging the thin-walled hose 4 with grooves or the like.

The displacement of the clamping ring 50 towards the clamping ring 36 by means of the tightening of the bolts 59 provides that the sealing ring 48 is forced against the outer surface of the tubular element 6 by the cooperation between the conical surfaces 52 and 54 of the sealing ring 48 and the conical surfaces of the clamping ring 50 and the end portion of the portion 11 of the sleeve-shaped connector element 8.

The connector device according to the invention provides in a simple way a reliable connection of a thin-walled hose with a tubular element. The device according to the invention is easy to mount and forms a good protection for the thin-walled hose.

The invention can be modified within the scope of the following claims.

I claim:

1. A device for connecting a thin-walled hose pulled into a pipe with a tubular element, comprising:

a sleeve-shaped connector element having a first end portion and a second end portion, said element being sealingly connectable at said first end portion with the tubular element by means of a sealing ring for sealing the sleeve-shaped connector element in relation to the tubular element and by a clamping ring for pressing said sealing ring against the connector element and the tubular element, and being sealingly connectable at said second end portion with the thin-walled hose by means of respective first and second annular sealing elements, said first and second sealing elements consisting of a highly elastic material, said first sealing element enclosing said second sealing element in substantially concentric relationship such that an annular space is defined between said first and second sealing elements, said thin-walled hose being positioned in said annular space;

said connector element including a flange portion at its second end portion, said flange portion including a conical surface, said conical surface being engageable with said first sealing element;

a locking ring axially pressed against said first sealing element so that said first sealing element engages said flange portion conical surface to provide a radial pressing of the first sealing element toward the wall of the thin-walled hose, said thin-walled hose being thereby pressed toward the second sealing element, said locking ring having a conical surface and engaging said first sealing element with said conical surface in a manner such that said axial pressing of said locking ring against the first sealing element provides for said radial pressing of the first sealing element against the wall of the thin-walled hose; and a clamping ring for pressing said locking ring against the wall of the thin-walled hose while being counteracted by an annular surface of said sleeve-shaped connector element for providing a clamping force and thereby an axial locking of the thin-walled hose in relation to the sleeve-shaped connector element.

2. A device as claimed in claim 1, characterized in that one of the annular sealing elements is positioned in a groove in the sleeve-shaped connector element.

3. A device as claimed in claim 2, characterized in that said sealing element positioned in the groove in the sleeve-shaped connector element is strip-shaped and has a section the thickness of which is in substantial agreement with the depth of the groove in a compressed condition of the sealing element.

4. A device as claimed in claim 1, wherein the locking ring consists of a plastic material.

5. A device as claimed in claim 1, characterized in that the clamping ring which is positioned at the end of the connector element positioned adjacent the thin-walled hose comprises a first clamping ring and is provided with a pipe socket directed from the connector element and constituting a connector socket for a protector pipe surrounding the thin-walled hose between the end portion of the pipe, into which the thin-waled hose has been pulled and the sleeve-shaped connector element.

6. A device as claimed in claim 5, characterized in that the protector pipe is connected with the pipe into which the thin-walled hose is pulled by means of a sleeve consisting of elastic material, which is pressed against the outer surfaces of the protector pipe and the pipe, respectively, by means of hose clamps.

7. A device as claimed in claim 6, wherein said sleeve consists of rubber.

8. A device as claimed in claim 1, characterized in that the clamping rings are connected with each other by means of clamping elements,: the clamping rings being adapted to be pressed against the locking ring and the sealing ring which is adapted to seal the sleeve-shaped connector element in relation to the tubular element, said pressing being provided by displacement of the clamping rings towards each other.

9. A device as claimed in claim 8, characterized in that the clamping ring which is positioned at the end of the connector element positioned adjacent the thin-walled hose is provided with a pipe socket directed from the connector element and constituting a connector socket for a protector pipe surrounding the thin-walled hose between the end portion of the pipe, into which the thin-walled hose has been pulled and the sleeve-shaped connector element.

10. A device as claimed in claim 9, characterized in that the protector pipe is connected with the pipe into which the thin-walled hose is pulled by means of a sleeve consisting of elastic material, preferably which is pressed against the outer surfaces of the protector pipe and the pipe, respectively, by means of hose clamps.

11. A device as claimed in claim 8, wherein said clamping elements comprise tensioning bolts.

12. A device as claimed in claim 10, wherein said sleeve consists of rubber.

* * * * *

UNITED STATES PATENT AND TRADEMARK OFFICE
CERTIFICATE OF CORRECTION

PATENT NO.  : 5,186,503

DATED       : February 16, 1993

INVENTOR(S) : Johan von Feilitzen

It is certified that error appears in the above-identified patent and that said Letters Patent is hereby corrected as shown below:

Claim 5, column 4, line 47, delete "thin-waled" and insert therefor --thin-walled--.

Claim 10, column 6, line 1, delete "preferably".

Signed and Sealed this

Second Day of November, 1993

Attest:

BRUCE LEHMAN

Attesting Officer

Commissioner of Patents and Trademarks